No. 741,381. PATENTED OCT. 13, 1903.
R. D. SCOTT.
APPARATUS FOR TREATING SKINS OR HIDES.
APPLICATION FILED DEC. 6, 1901.
NO MODEL. 4 SHEETS—SHEET 1.

Witnesses,
CW Benjamin
M. Manning

INVENTOR
R. D. Scott,
BY T. P. Bourne,
his ATTORNEY

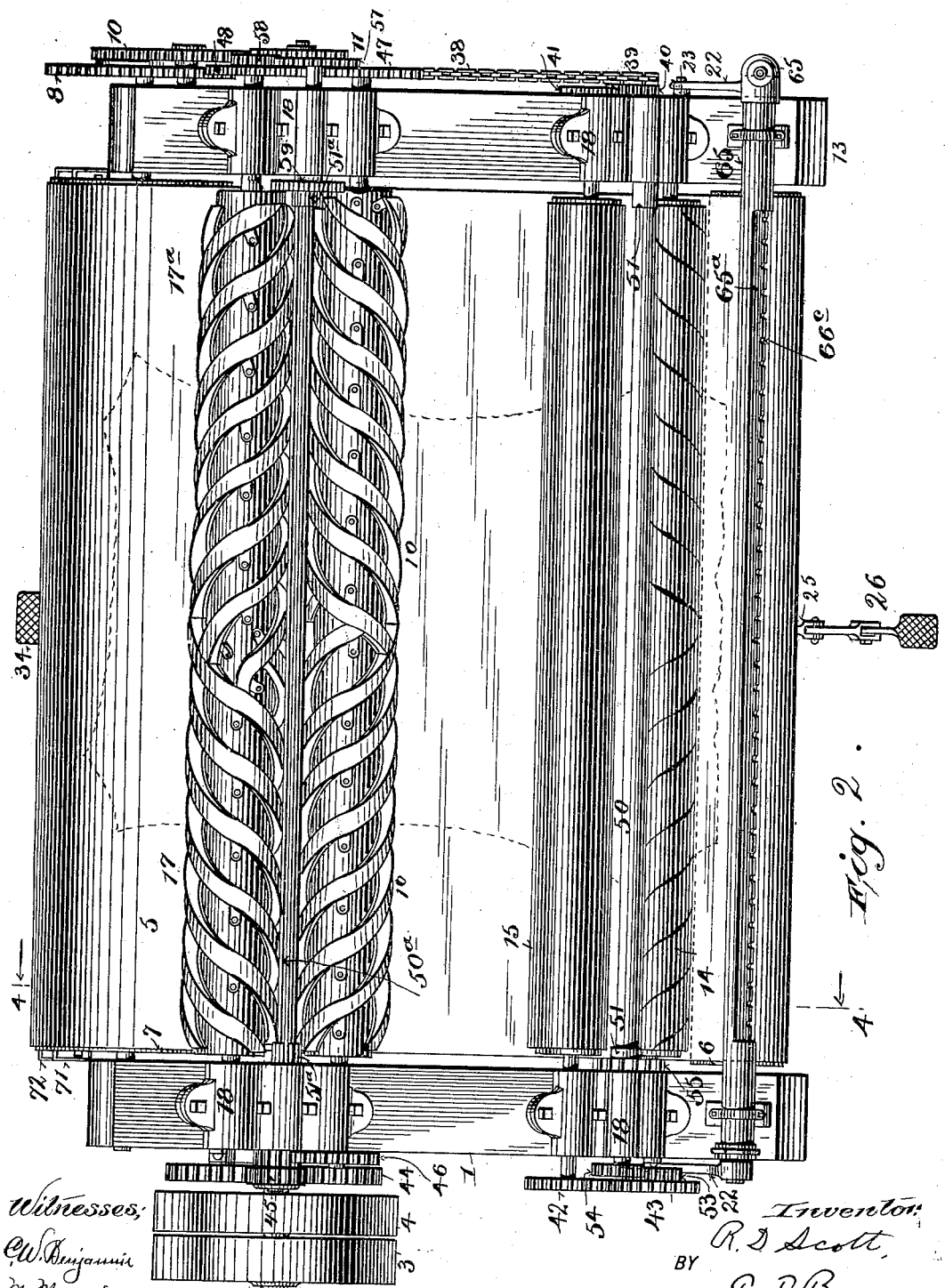

No. 741,381. PATENTED OCT. 13, 1903.
R. D. SCOTT.
APPARATUS FOR TREATING SKINS OR HIDES.
APPLICATION FILED DEC. 6, 1901.
NO MODEL. 4 SHEETS—SHEET 3.
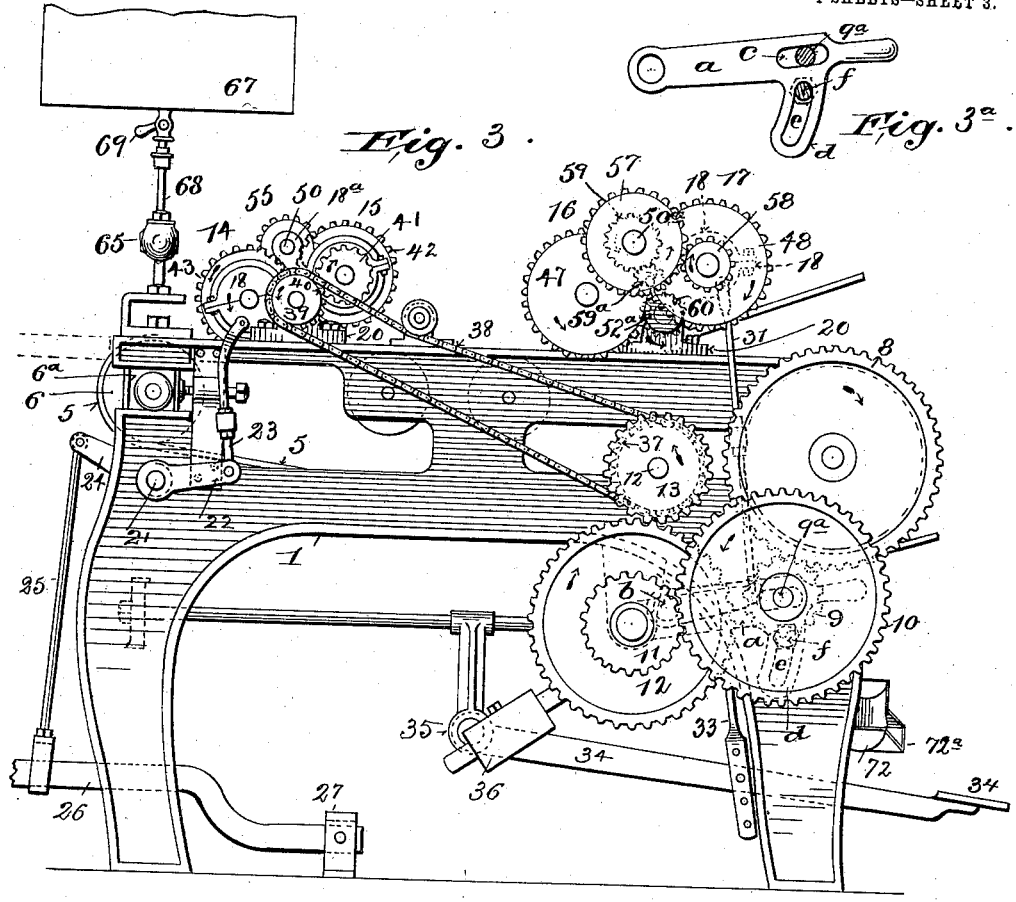
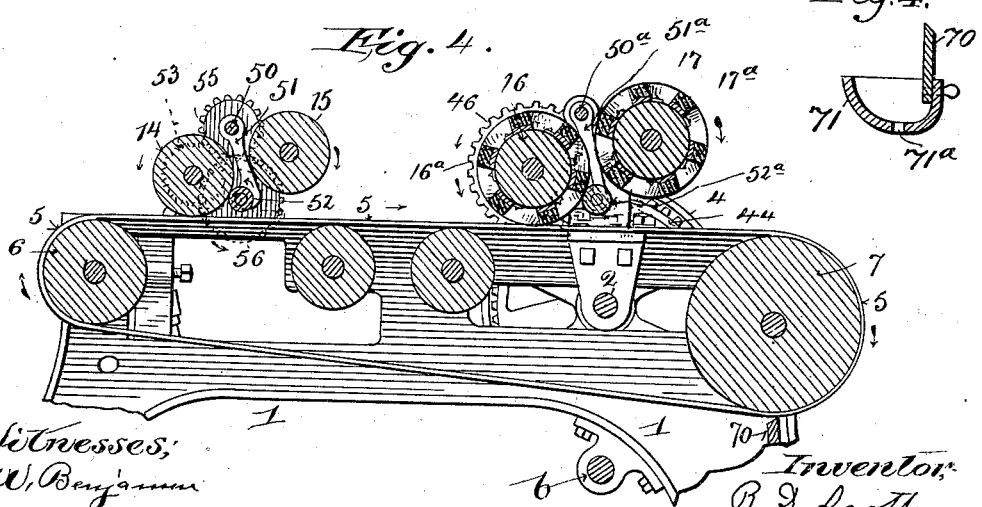

No. 741,381. PATENTED OCT. 13, 1903.
R. D. SCOTT.
APPARATUS FOR TREATING SKINS OR HIDES.
APPLICATION FILED DEC. 6, 1901.
NO MODEL. 4 SHEETS—SHEET 4.

Witnesses:
C. W. Benjamin
M. Manning

Inventor,
R. D. Scott,
by T. F. Bourne
his atty

No. 741,381. Patented October 13, 1903.

UNITED STATES PATENT OFFICE.

RUFUS D. SCOTT, OF BEVERLY, MASSACHUSETTS, ASSIGNOR TO SCOTT LEATHER MACHINE COMPANY, A CORPORATION OF NEW YORK.

APPARATUS FOR TREATING SKINS OR HIDES.

SPECIFICATION forming part of Letters Patent No. 741,381, dated October 13, 1903.

Application filed December 6, 1901. Serial No. 84,889. (No model.)

*To all whom it may concern:*

Be it known that I, RUFUS D. SCOTT, a citizen of the United States, and a resident of Beverly, Essex county, State of Massachusetts, have invented certain new and useful Improvements in Apparatus for Treating Skins or Hides, of which the following is a specification.

My invention relates to improvements in apparatus for applying a seasoning material to skins or hides and rubbing the seasoning into the same for finishing it; and among the objects of my invention are to provide improved means for causing the seasoning and rubbing-in rolls to act upon the skin as it passes through the machine, also to provide means to prevent the skin from becoming wound around the roll as it passes under the same, and, further, to provide improved means for applying seasoning to the skin.

To these ends my invention comprises the novel details of improvement, that will be more fully hereinafter set forth, and then pointed out in the claims.

Reference is to be had to the accompanying drawings, forming a part hereof, wherein—

Figure 1:
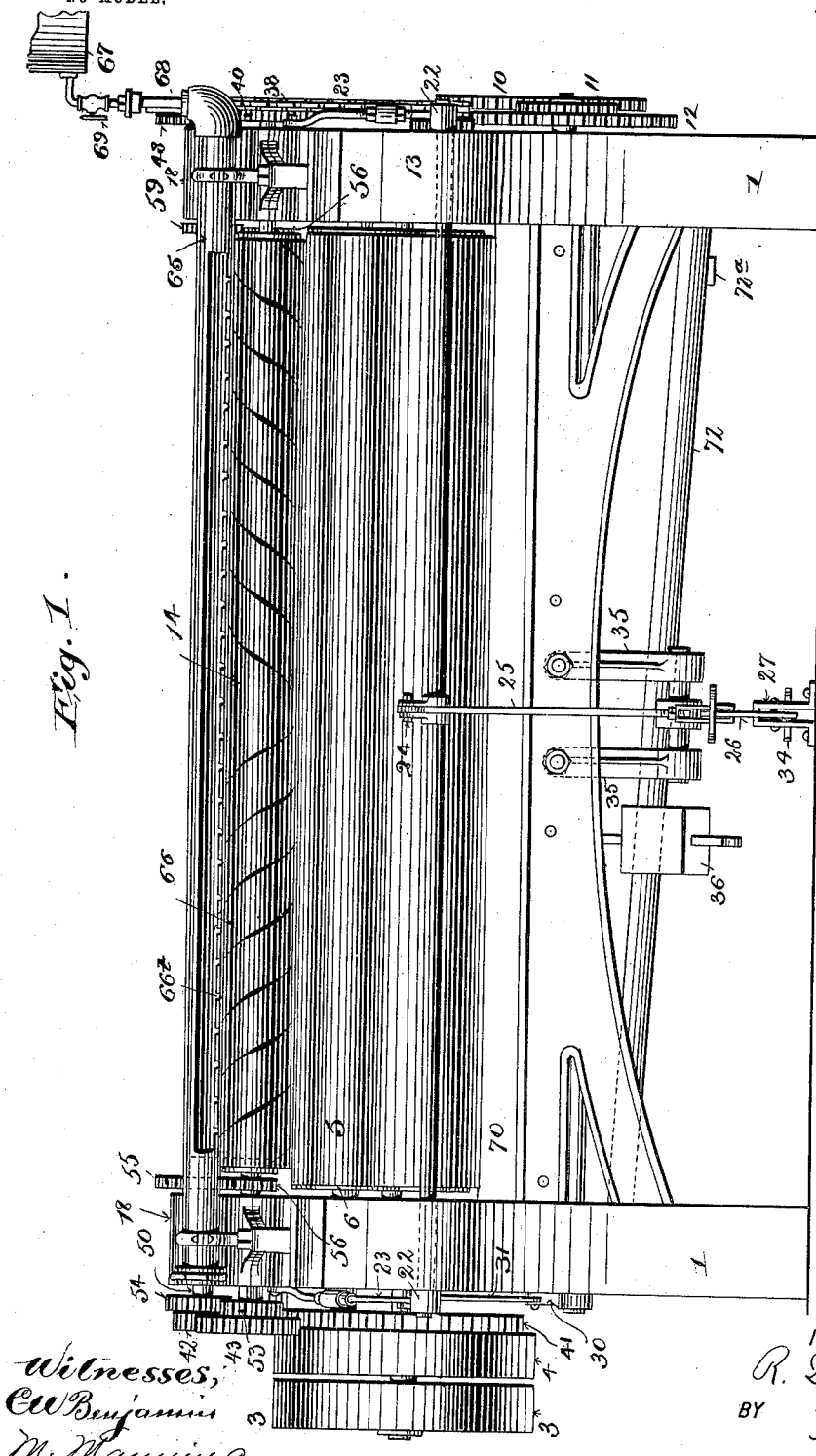
Figure 5:
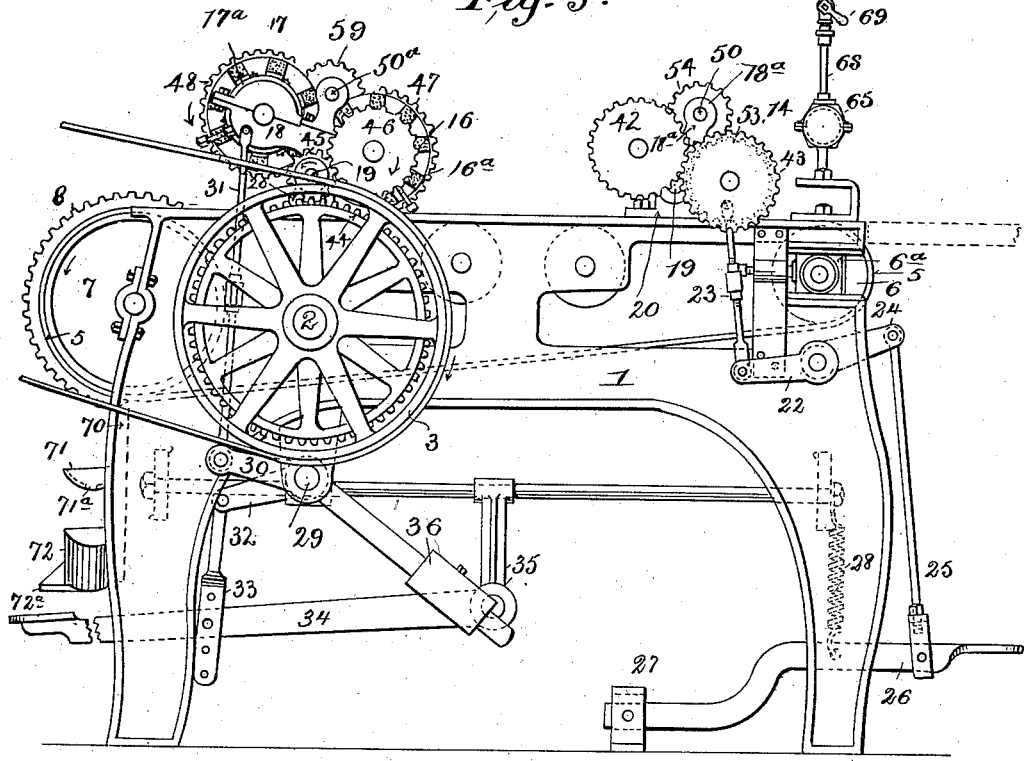
Figure 6:
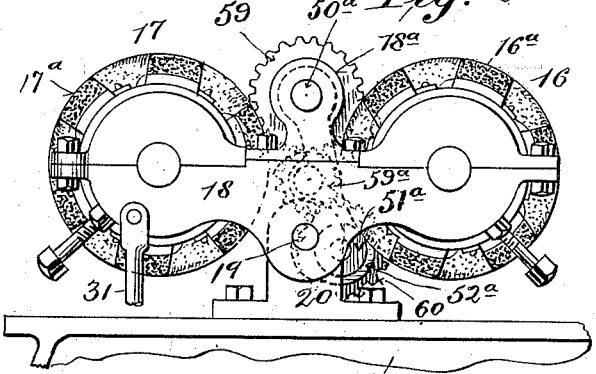

Figure 1 is a front elevation of a machine embodying my improvements. Fig. 2 is a plan view thereof. Fig. 3 is a side elevation looking from the right in Fig. 1. Fig. 3ª is a detail hereinafter explained. Fig. 4 is a longitudinal section substantially on the plane of the line 4 4 in Fig. 2. Fig. 4ª is a detail section of the scraper and its trough. Fig. 5 is a side elevation looking from the left in Fig. 1; and Fig. 6 is a side view, enlarged, of the rubbing-in rolls, part of the gearing being removed.

Similar numerals and letters of reference indicate corresponding parts in the several views.

The numeral 1 in the drawings indicates the main frame of the machine, which may be of suitable construction, and 2 is the main driving-shaft, journaled in suitable bearings in the frame and provided with fast and loose pulleys 3 4 or other suitable means for rotating it.

5 is a carrier or feeding-belt, which is shown mounted upon drums or rollers 6 7, whose shafts are journaled in suitable bearings in the frame. The drum 6 may be carried in adjustable blocks 6ª for the purpose of regulating the tension of the carrier or belt 5.

The means I have shown for operating the carrier 5 comprises a gear 8, secured to the drum 5 or its shaft, and a train of gearing 9 10 11 12 13, supported in suitable bearings on frame 1, the gear 13 being carried by shaft 2, as indicated in Fig. 3, whereby the carrier is operated at the desired speed from the main shaft 2. As a convenient means for varying the relative speed of travel of carrier 5 I provide an arm *a*, pivotally supported by frame 1, as at *b*, which arm has a longitudinal slot *c* to receive the shaft or support of the gears 9 10, which shaft may be secured to said arm by a nut or the like. The arm *a* also has an extension *d*, provided with a slot *e* to receive a screw or bolt *f*, carried by frame 1, for holding the arm rigid. By these means different sizes of gears 9 may be used as desired, and the slot *e* and bolt or screw *f* permit the arm *a* to be raised and lowered to adjust such different-sized gears to the gear 8.

14 15 are the seasoning-rolls or the rolls for applying the seasoning material to the skin, and they are located above the carrier 5, near the front portion of the machine. These rolls are maintained in parallel relation at a short distance apart, and near the rear portion of the machine are the rubbing-in rolls 16 17, also arranged side by side at a suitable distance apart, and all of said rolls are adapted to act upon the skin or hide passing beneath them upon the carrier 5.

The means I have shown for supporting and rocking the pairs of rolls 14 15 and 16 17 are similar, and therefore a description of one will suffice for both, as follows: At opposite ends of each pair of rolls their shafts are journaled in bearings in a rocker arm or beam 18, each of which rocker-arms is journaled at a point between the rolls, as at 19, Fig. 6, as upon brackets 20, projecting from frame 1. By this means either roll of a pair may be brought into contact with a skin passing beneath it upon the carrier 5 as may be desired. Any suitable means may be provided for rocking the arms 18 to bring either of the rolls into contact with a skin. I provide for the front rolls a shaft 21, journaled in frame 1 and having, preferably at both sides of the machine, crank-arms 22, connected by suitable links 23 with the corresponding rocker-arm 18, and said shaft has a crank 24, connected by a link 25 with a treadle 26, suitably pivoted, as at 27. (See Figs. 3 and 5). A spring 28 connects the treadle 26 with part of the main frame 1 and serves to draw the roller 14 down upon the carrier 5. For the rear rolls 16 17 I provide a shaft 29, journaled in frame 1 and which has a crank-arm 30, preferably at each side of the machine, connected by a link 31 with the corresponding rocker-arm 18, and shaft 29 also has a crank-arm 32, connected by a link 33 with a treadle 34, pivotally supported, as at 35, a counterweight 36 or its equivalent connected with shaft 29 serving to draw roll 16 down upon carrier 5, as indicated in Figs. 3 and 5.

From the foregoing it will be understood that by depressing the treadles the roll 14 or 16 will be raised from the carrier and roll 15 or 17 pressed thereon for purposes which will be hereinafter explained.

The seasoning-rolls are preferably to be rotated in reverse directions, and as a convenient means for operating them I provide the following arrangement: Upon shaft 2 is a sprocket-wheel 37, over which passes a chain 38 to a sprocket-wheel 39 on a shaft carried by one of the supports 20, (see Fig. 3,) and 40 is a pinion connected with said sprocket and in mesh with a gear 41, connected with one of the rolls, as with the shaft of the roll 15. At the opposite end the roll 15 carries a gear 42, in mesh with a gear 43, connected with the roll 14, whereby the rolls 14 15 will be rotated in reverse directions, as indicated by the arrows in Fig. 4. The rubbing-in rolls 16 and 17 are also preferably to be rotated conjointly in reverse directions, and for this purpose I have shown a gear 44, connected with shaft 2 at the end opposite gear 37, the gear 44 meshing with a pinion 45, journaled on the support 20, the pinion 45 meshing with the gear 46, secured to the shaft of one of the rubbing-in rolls, as the roll 16. The roll 16 also carries a gear 47, which meshes with a gear 48, connected with the roll 17, whereby said rolls are rotated in opposite directions, as indicated in Fig. 4.

With the rolls rotating in the directions indicated in Fig. 4 in conjunction with a carrier passing at its upper portion from left to right, as by the arrow in Fig. 4, there is liability that the skin or hide might wrap around the roll 14 or 16 before reaching the corresponding roll 15 or 17, and to prevent this I provide means adjacent to the roll that will act to keep the skin as it passes from under the roll down upon the carrier. I have found in practice that a rotating shaft or roller adjacent to the roll, on the side opposite that which receives the skin, and rotating in the same direction as said roll prevents the skin from wrapping around the roll, and as a convenient means for supporting and operating such shaft or roller I provide an arrangement as follows: To the rocker-arms 18 of the rolls 14 15 is journaled a transversely-extending shaft 50, parallel with the rolls and carried by supports 18ª on each rocker-arm. From the shaft 50 depend arms 51 near opposite ends of the rolls, in which arms a shaft or roller 52 is journaled in such position as to be below the axis of roller 14 and to come in contact therewith. (See Fig. 4.) The shaft 50 is rotated from one of the rolls, and for this purpose I have shown the roll 14 provided with a gear 53, meshing with a gear 54, secured to shaft or roller 50. (See Fig. 2.) Shaft 50 also has a gear 55, which meshes with a gear 56, secured to shaft or roller 52, (see Fig. 4,) whereby as roll 14 rotates in the direction of the arrow in Fig. 4 the shaft or roller 52 by the gearing described will be rotated in the same direction, and as the shaft or roller 52 is adapted to engage roll 14 it will be seen that if the skin seeks to become wrapped around roll 14 the shaft or roller 52 will push it back and prevent such action. A similar arrangement is provided for the roll 16—that is to say, a shaft 50ª is supported by the rocker-arms 18 of such rolls and has depending arms 51ª, which carry a shaft or roller 52ª in engagement with roll 16. (See Figs. 4 and 6.) The shaft 50ª has a gear 57, which meshes with pinion 58, connected with roll 17. The shaft 50ª also has a gear 59 meshing with a pinion 59ª, supported by arm 18, pinion 59ª meshing with a gear 60 on shaft or roller 52ª. Thus as roll 17 is rotated the gears 57, 58, 59, 59ª, and 60 will rotate shaft or roller 52ª in the direction of rotation of roll 16 to prevent the skin from wrapping around roll 16.

From Fig. 4 it will be seen that the position of the shaft 50 or 50ª with respect to the adjacent periphery of the roll 14 or 16 is such that the arms 51 or 51ª, depending from said shafts, will cause the shaft or roller 52 or 52ª to swing toward the roll 14 or 16 when said rolls are in the position of acting with the carrier 5, and the rotation of the gears 55 and 59 in the direction of their arrows will tend to keep the shaft or roll 52 or 52ª in engagement with the corresponding roll 14 or 16.

It will be observed that as the shafts 50 and 50ª are supported by the arms 18 they will maintain their positions relative to the corresponding rolls into whichever position said rolls may be adjusted, so that when the roll 14 or 16 is depressed toward the carrier the shaft or roller 52 or 52ª will always be in operative relation with respect thereto.

The rolls 14 15 16 17 may be provided with any suitable surface adapted to act upon the skin or hide. Rolls 14 15 may be covered with skin, felt, or similar material. The rubbing-in rolls 16 17 are preferably provided with spirally-disposed ribs or strips 16ª 17ª of felt or its equivalent, and said ribs or strips may be secured to the rolls by clips or by any other suitable means. By preference the ribs or strips are arranged in reverse spiral directions from the central portion toward the outer ends, so as to have the effect of stretching the skins laterally when they pass under the rolls.

For applying the seasoning mixture to the skins or hides I have provided means for dropping the seasoning directly upon the skins before they reach the seasoning-rolls 14 15, and for this purpose I have provided a trough or pipe 65, extending across the machine above the carrier 5 in advance of the roll 14, and said trough is shown in the form of a pipe having one side cut away at 65$^a$, providing a relatively short upwardly-extending flange 66, which has a series of notches 66$^a$, so that the seasoning can overflow through said notches upon the skin below. The seasoning may be supplied to the trough 65 from a suitable tank 67, connected therewith by a pipe 68, provided with a valve 69, the tank 67 being supported in suitable manner.

As it is desired to have the carrier 5 as clean as possible where the skin rests upon it, I provide a scraper 70, extending across the main frame and suitably secured thereto, so as to engage the carrier 5 and scrape therefrom surplus seasoning mixture after a skin has been treated. A trough 71 beneath the scraper 70 serves to collect the seasoning scraped from the carrier. Said trough has a slot 71$^a$ in its bottom and is above an inclined trough 72, having an outlet 72$^a$, from which the surplus seasoning mixture may be collected. The parts 70, 71, and 72 may be suitably supported by frame 1. As the carrier advances from the drum 6 toward the roll 14, where the skin is laid upon the carrier, the latter will be comparatively clean.

The operation of my improvements may be described as follows: The skin or hide to be treated is placed upon the carrier 5 adjacent to the roller 6 and the seasoning is allowed to drip from the supply-trough 65 upon the skin. The skin is fed under roll 14, which is now depressed, and acting with the carrier 5 will push the skin forwardly, and as the skin passes along the seasoning will be supplied upon the same throughout its length, the shaft or roller 52 preventing the skin from wrapping around the roll. After the front portion of the skin has passed from under the roll 14 and is about under the roll 15 the treadle 26 is depressed, whereupon the rolls 14 15 are rocked to raise the roll 14 from the skin and to depress the roll 15 upon the skin with the desired degree of pressure. The roll 15 rotates at a comparatively high speed and in the direction reverse to the direction of the movement of the carrier, whereupon the seasoning is distributed upon the skin by said roll; but the roll 15 will not prevent the travel of the skin forwardly on the carrier owing to the frictional contact of the skin with the carrier. The skin next passes under the rubbing-in roll 16, which is preferably rotated in the direction of movement of the carrier, and thereby said roll and the carrier continue to feed the skin forwardly while the ribs upon the roll tend to stretch the skin laterally, the shaft or roller 52$^a$ serving to keep the skin from wrapping around the roll 16. When the forward edge of the skin is about under the rubbing-in roll 17, the rolls 16 and 17 are rocked by the treadle 34 to raise the roll 16 from the skin and depress the roll 17 upon the skin with the desired degree of pressure. The latter roll preferably rotates in the direction reverse to the movement of the carrier and is given a comparatively high speed, and thereby serves to rub the seasoning into the skin, while at the same time stretching the skin laterally, whereby the seasoning is thoroughly distributed throughout the surface of the skin and rubbed into the pores thereof smoothly and evenly. As the skin passes from roll 17 any of the seasoning that may have passed upon the carrier will be scraped therefrom, so as to present a clean surface to a new skin. It will be understood that as soon as a skin passes from beneath a pair of rolls their treadle will be released, so that the rolls may return to their initial operative positions. (Shown in Fig. 4.)

It will be observed that the roll 15 may be maintained upon the skin while the forward portion of said skin passes under the roll 16, and thereby the latter tends to feed the skin along the carrier during part of the action of the roll 15 upon the skin in a reverse direction, and that as soon as the skin passes from roll 15 the rolls 14 15 can be rocked to their normal positions and a new skin fitted under them, while the rolls 16 17 continue to act upon the skin that has passed from the roll 15. Thus the two pairs of rolls coact in a measure together, and the speed of operation of the machine is increased, because a roll of each may simultaneously act upon portions of two skins. By having each pair of rolls provided with rocker-arms and connections a convenient means is provided for raising the forward or feeding rolls 14 16 from the skin and simultaneously depressing the rubbing-in rolls 15 17 upon the skin by the action of a single treadle for each pair, the advantages of which will be obvious. If seasoning mixture drops upon the carrier, it will not injure the flesh side of the skin, which is presented upon the carrier, because the position of the trough 65 is such that a clean portion of the carrier is always in position to receive the skin at the forward part of the machine in advance of the trough, and thus as soon as the skin passes under the latter the seasoning will drop upon the skin.

I do not limit my invention to the precise details of construction, as they may be varied without departing from the spirit of my invention.

Having now described my invention, what I claim is—

1. A machine of the character described comprising a frame, a carrier, a pair of rolls extending transversely of the latter, and means connecting both rolls together so that they may oscillate or rock in unison to cause either roll to bear upon a skin on the carrier while the other roll is out of engagement therewith, and means located in front of the forward roll to supply seasoning upon a skin upon the carrier before the skin passes under the rolls, substantially as described.

2. A machine of the character described comprising a frame, an endless belt, a pair of drums or rollers carrying the belt, a pair of rolls extending transversely of the belt and located at a distance back of the forward drum or roller, means for supporting said rolls so that they may oscillate or rock in unison, and means operatively connected with both rolls for maintaining one of the rolls normally in operative relation to the carrier and for rocking or oscillating said rolls to simultaneously raise one from the carrier and depress the other thereon, substantially as described.

3. A machine of the character described comprising a frame, a carrier, a pair of rolls extending transversely of the carrier, rocker-arms carrying both of said rolls, means for supporting said arms so they may rock or oscillate, means for rocking said arms to cause either of the rolls to act with the carrier, and means located in front of the forward roll to supply seasoning upon a skin upon the carrier before the skin passes under the rolls, substantially as described.

4. A machine of the character described comprising a frame, a carrier, a pair of rolls, rocker-arms carrying both of said rolls, means for pivotally supporting said arms, gearing for rotating said rolls, gearing connected with one of said rolls for operating the same, means for rocking or oscillating said rolls, and means located in front of the forward roll to supply seasoning upon a skin upon the carrier before the skin passes under the rolls, substantially as described.

5. A machine of the character described comprising a frame, a carrier, a roll, means for rotating said roll, a shaft or roller extending along said roll to coact therewith, arms pivotally supported above said shaft or roller, the latter being journaled in the lower depending ends of said arms to swing against said roll, and gearing for rotating said shaft or roller, substantially as described.

6. A machine of the character described comprising a frame, a carrier, a pair of rolls, rocker-arms carrying said rolls, means for supporting said arms, gearing for rotating said rolls, a roller extending along one of said rolls, means for supporting said roller, and gearing connecting the latter with one of said rolls for rotating said roller, substantially as described.

7. A machine of the character described comprising a frame, a carrier, a pair of rolls, rocker-arms supporting said rolls, means for supporting said arms, gearing for operating said rolls, a shaft carried by said arms, a roller extending along one of said rolls, arms to support said roller, gearing connecting the shaft with said roller, and means for rotating said shaft, substantially as described.

8. A machine of the character described comprising a frame, a carrier, two pairs of feeding-rolls extending transversely thereof, rocker-arms supporting each pair of rolls independently, means for supporting said arms, gearing for operating each pair of rolls independently, and means for independently oscillating each pair of rolls, substantially as described.

9. A machine of the character described comprising a frame, a carrier, a shaft having a gear, a pair of rolls, means connecting both rolls together so they may rock or oscillate in unison, a pinion in mesh with said gear, a gear connected with one of said rolls and in mesh with said pinion, gearing connecting said rolls to rotate them, and means located in front of the forward roll to supply seasoning upon a skin upon the carrier before the skin passes under the rolls, substantially as described.

10. A machine of the character described comprising a frame, a carrier, a pair of rolls, rocking arms supporting said rolls, a gear connected with one of the rolls, means for operating said gear, and gearing connecting said rolls for rotating said rolls in unison, and means located in front of the forward roll to supply seasoning upon a skin upon the carrier before the skin passes under the rolls, substantially as described.

RUFUS D. SCOTT.

Witnesses:
T. F. BOURNE,
M. MANNING.